Inventor
GUSTAV A. REHM

Sept. 23, 1941.  G. A. REHM  2,256,576
STEAM GENERATOR
Filed Dec. 19, 1939   5 Sheets-Sheet 3

Inventor
GUSTAV A. REHM
By Albert G. Blodgett
Attorney

Sept. 23, 1941.　　　　G. A. REHM　　　　2,256,576
STEAM GENERATOR
Filed Dec. 19, 1939　　　5 Sheets-Sheet 5

Inventor
GUSTAV A. REHM
Albert G. Blodgett
Attorney

Patented Sept. 23, 1941

2,256,576

UNITED STATES PATENT OFFICE 2,256,576

STEAM GENERATOR

Gustav A. Rehm, Worcester, Mass., assignor to Riley Stoker Corporation, Worcester, Mass., a corporation of Massachusetts Application December 19, 1939, Serial No. 309,974

5 Claims. (Cl. 122—347)

This invention relates to steam generators, and more particularly to steam generators of the water tube type having a water cooled combustion chamber in which fuel may be burned at a comparatively high rate.

It is one object of the invention to provide a steam generator which will have a large capacity in proportion to the floor space required for its installation.

It is a further object of the invention to provide a steam generator having upper and lower drums connected by a bank of water tubes, and means effective to protect the drums from contact with gases at excessively high temperatures.

It is a further object of the invention to provide a novel arrangement of a water tube steam generator and a superheater, such that the superheater will be subjected to high temperature gases and yet protected from slag deposits.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts, Fig. 1 is a longitudinal section through a steam generator, taken on the line 1—1 of Fig. 2;

Figure 1:
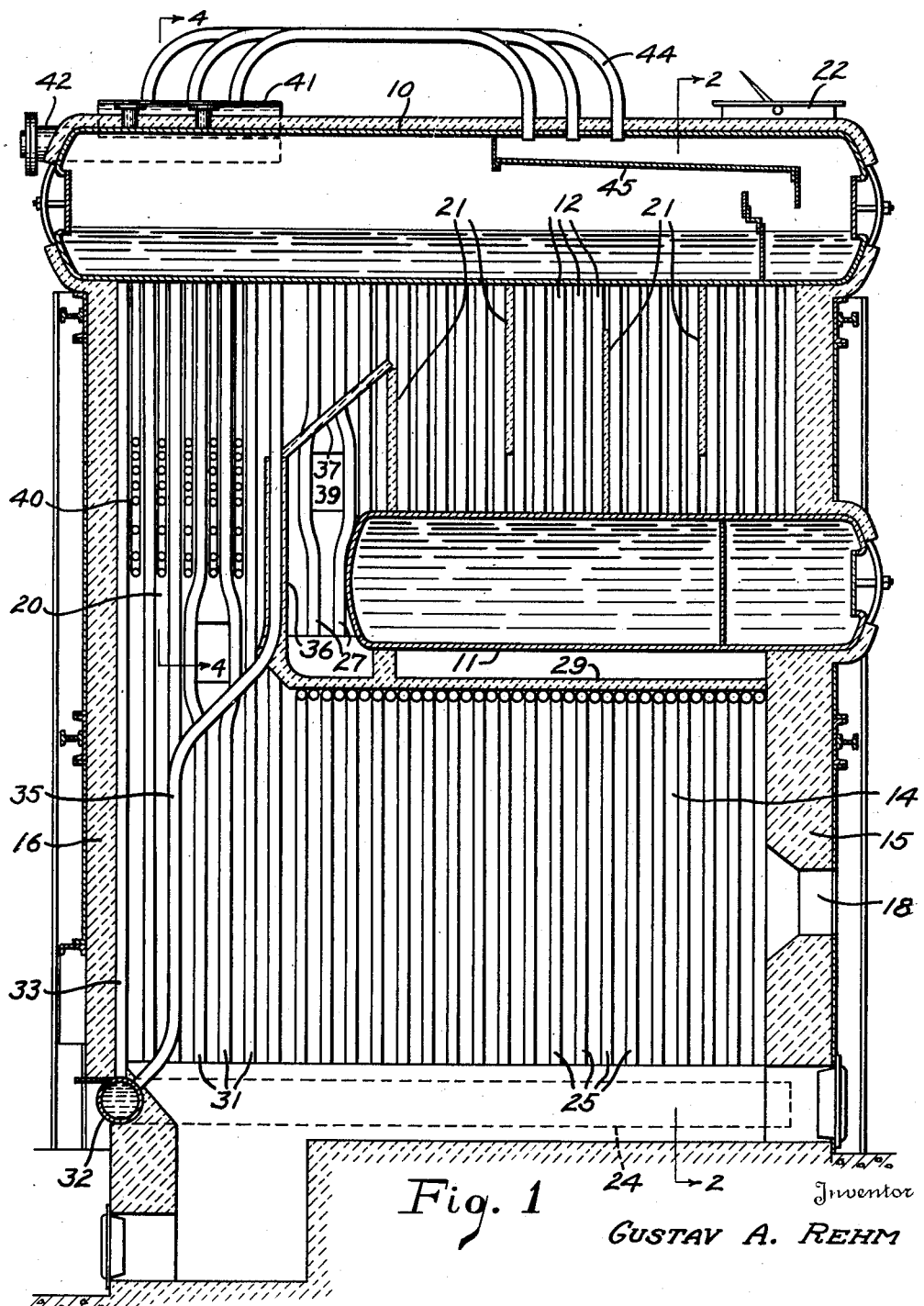
Figure 2:
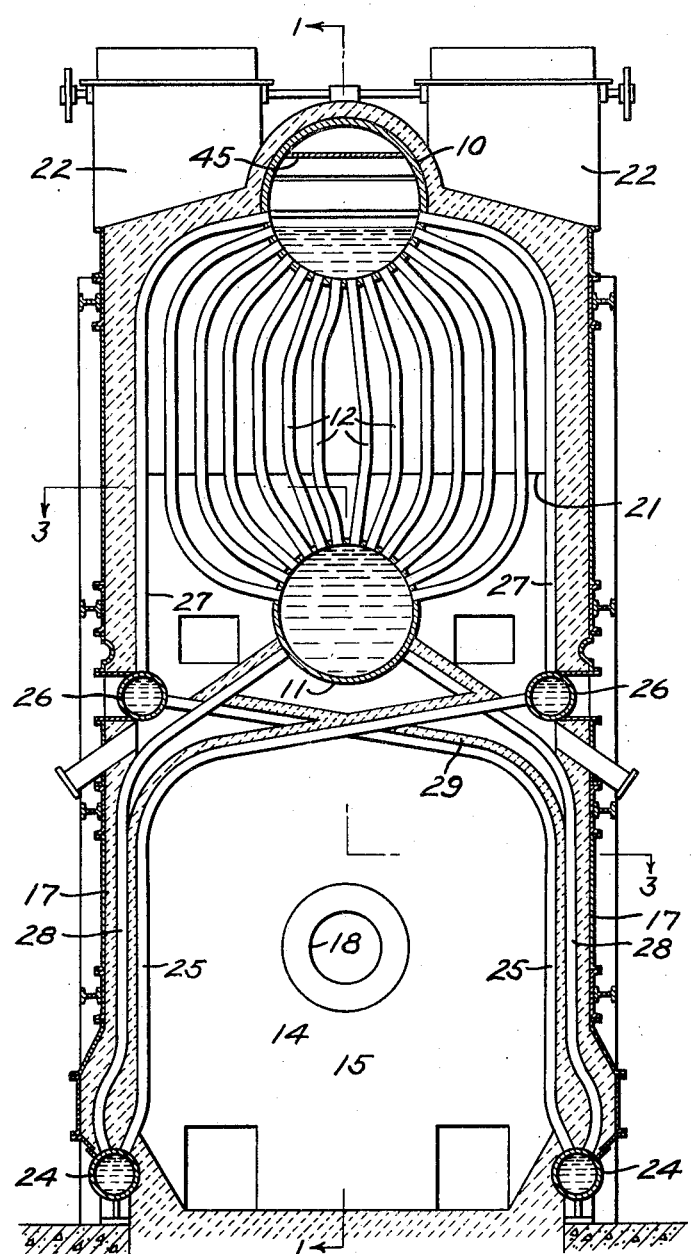
Fig. 2 is a section on the line 2—2 of Fig. 1.
Figure 3:
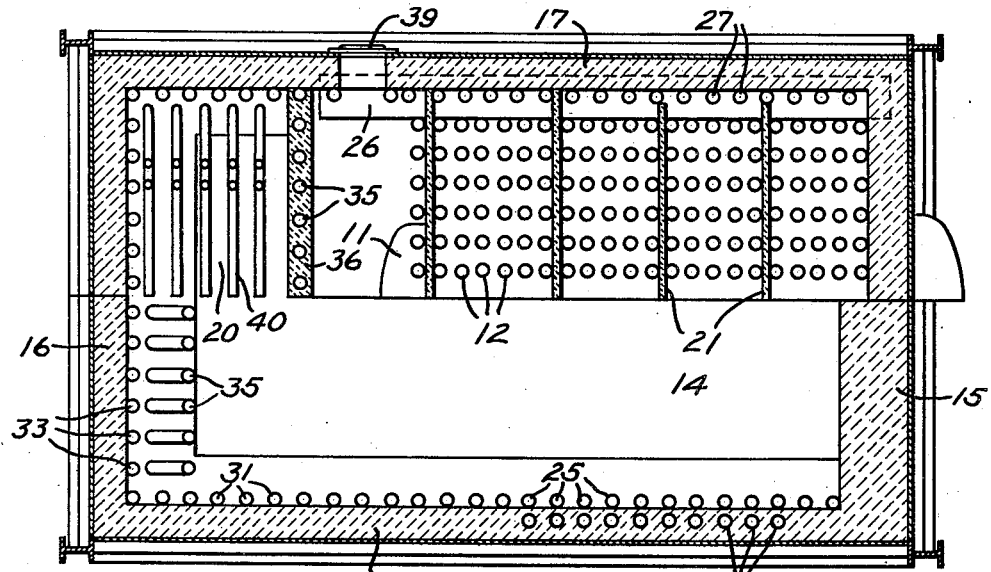
Fig. 3 is a section on the line 3—3 of Fig. 2.
Figure 4:
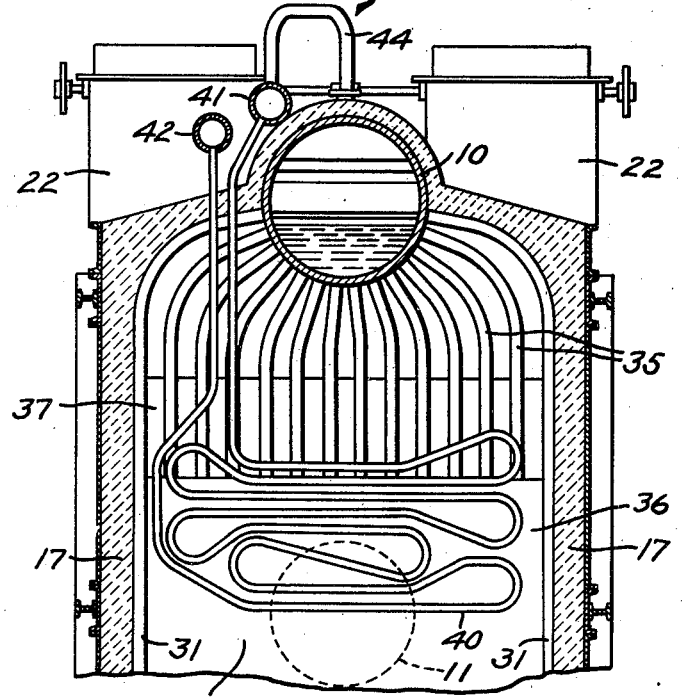
Fig. 4 is a section on the line 4—4 of Fig. 1.
Figure 5:
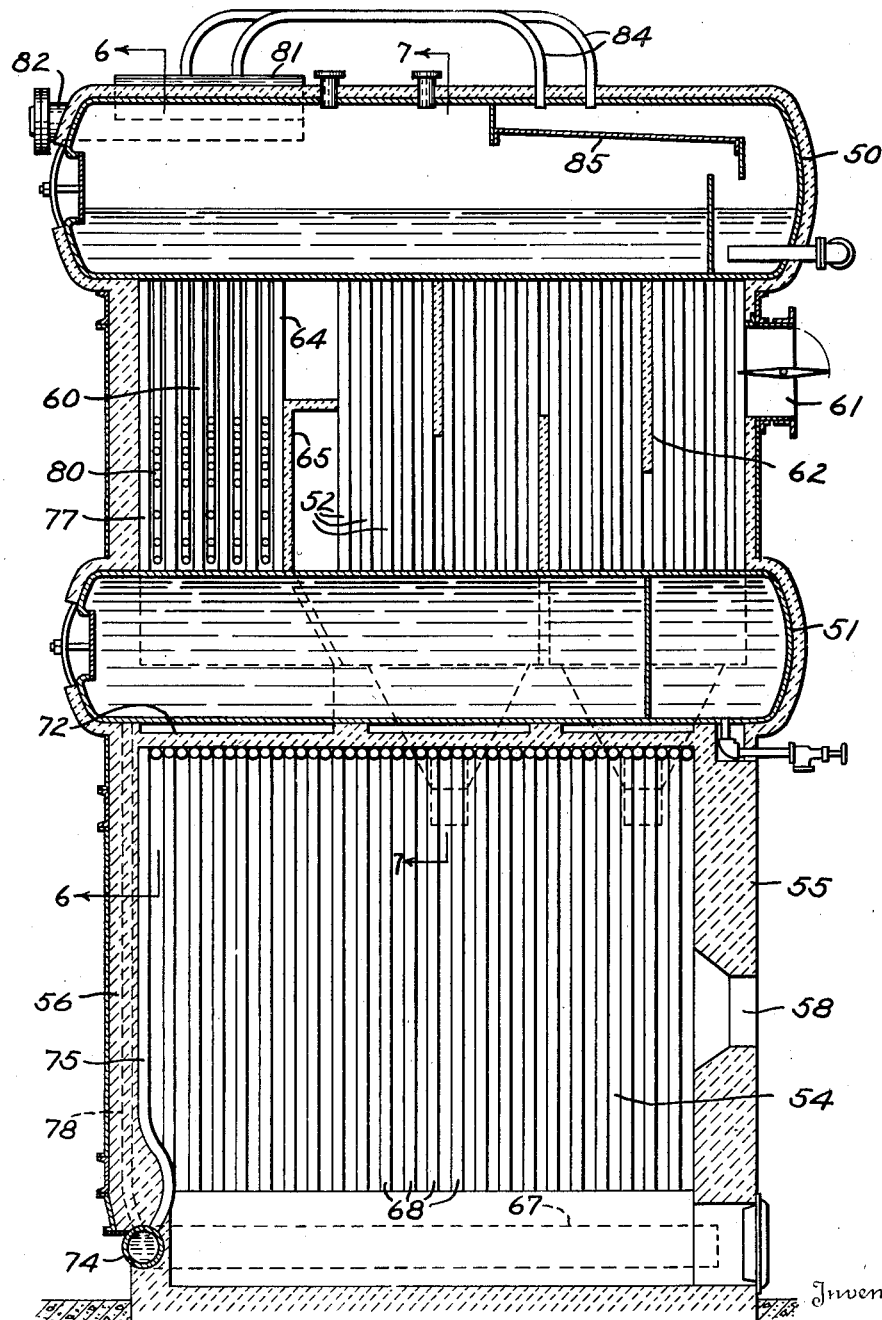
Fig. 5 is a longitudinal section through a modified form of stream generator, taken on the line 5—5 of Fig. 6.
Figure 8:
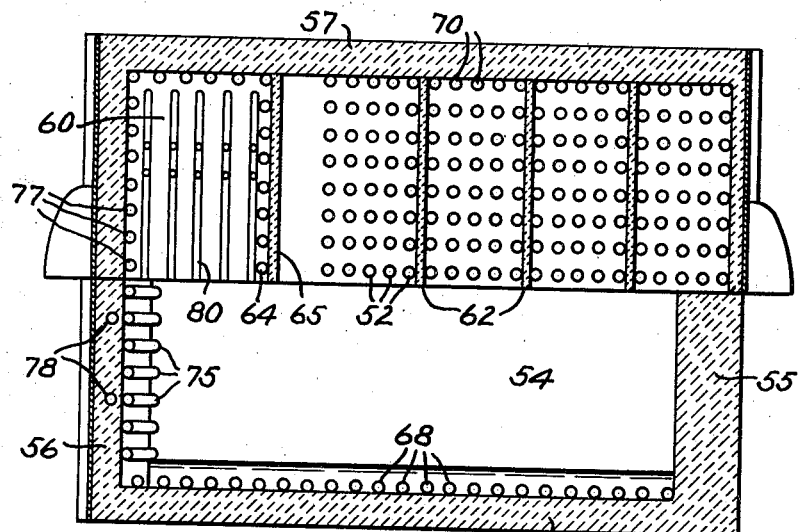
Fig. 8 is a section on the line 8—8 of Fig. 6.

The embodiment illustrated in Figs. 1 to 4 inclusive comprises an upper longitudinal steam-and-water drum 10 and a lower longitudinal water drum 11 therebeneath, these drums being connected by a bank of upright water tubes 12. Directly beneath the lower drum 11 there is provided a combustion chamber 14 having a front wall 15, a rear wall 16, and opposed side walls 17, these walls forming a setting for the steam generator. An opening 18 is provided in the front wall so that a suitable fuel, such as oil or pulverized coal, may be introduced therethrough for combustion in suspension. The lower drum 11 is shorter than the upper drum 10, and the water tube bank 12 is spaced forwardly from the rear wall 16 to provide a passage 20 through which the hot gases may flow upwardly from the combustion chamber and thence into contact with the water tubes 12. Upright baffles 21 are provided among the tubes 12 to deflect the gases into a zig-zag path as they flow forwardly toward two gas outlet ducts 22 located on opposite sides of the upper drum 10 at the front end thereof.

Two longitudinal headers 24 are provided on opposite sides of the combustion chamber 14 near the floor thereof, and upright water wall tubes 25 extend upwardly from these headers in cooling relationship to the side walls 17, the upper portions of these tubes being bent laterally and crossing beneath the lower drum 11. The upper ends of the tubes 25 are connected to longitudinal headers 26 on opposite sides of the water drum 11. From these headers 26 water tubes 27 extend upwardly to the upper drum 10. Downcomer tubes 28 connect the lower drum 11 with the lower headers 24, these downcomer tubes passing between the laterally extending portions of the tubes 25. These laterally extending portions serve to support refractory material 29 which forms a roof for the combustion chamber 14 and aids in protecting the lower drum 11 from the heat of combustion. In the rear portion of the combustion chamber the side walls 17 are cooled by means of water wall tubes 31 which extend upwardly from the headers 24 to the upper drum 10. The rear ends of the headers 24 are connected by a transverse header 32 from which a row of water wall tubes 33 extends upwardly in cooling relationship to the rear wall 16, the upper ends of these tubes 33 being connected to the upper drum 10 in a circumferential row.

A row of spaced upright water tubes 35 extend upwardly from the rear header 32 in front of the water tubes 33, the upper portions of these tubes 35 being offset forwardly and connected to the upper drum 10 in a circumferential row. The tubes 35 support a wall 36 of refractory material located in the rear of the lower drum 11 and forming the front wall of the gas passage 20, the lower edge of this wall connecting with the rear margin of the combustion chamber roof 29. The upper edge of the wall 36 is connected to the upper edge of the rearmost of the baffles 21 by means of an upwardly and forwardly sloping panel 37 of refractory material. Access may be had to the space between the wall 36 and the rear end of the lower drum 11 through a door 39 in one side wall 17.

Within the gas passage 20 there is provided a superheater 40 having an inlet header 41 and an outlet header 42 located adjacent the upper drum 10. Steam from the upper drum is delivered to the inlet header through tubes 44. A baffle plate 45 is mounted within the drum 10 and beneath the inlet ends of the tubes 44 to ensure the delivery of substantially dry steam to the superheater.

In the operation of this embodiment the water tubes 25 will be subjected to the intense radiant heat of the combustion gases in the chamber 14, and they will generate steam at a comparatively high rate. This steam will flow upwardly through the tubes 27 to the upper drum 10. Water will be supplied from the lower drum 11 to the lower ends of the water tubes 25 through the downcomers 28. The hot gases will flow rearwardly from the combustion chamber 14 past the water tubes 35 and thence upwardly into contact with the superheater 40 in the passage 20. The tubes 35 will serve as efficient steam generators and they will also form a slag screen to prevent the deposit of molten or sticky slag particles on the superheater. After passing the superheater the gases will flow forwardly over the top of the wall 36 and into contact with the water tubes 12. The baffles 21 will direct the gases in a tortuous path during their forward travel toward the outlet ducts 22. Since the entire length and width of the setting is taken up by the combustion chamber, the steam generating capacity of the unit will be very high in proportion to the area of the floor space occupied. The lower drum 11 is well protected from the hot gases by the water tubes 25 and the refractory material 29. Before entering the convection tube bank 12 the hot gases are compelled to flow twice across the slag screen tubes 35, and while traveling upwardly in the gas passage 20 they are cooled by the transfer of heat to the superheater 40 and to the water wall tubes 33 and 31. Consequently there is no danger of slag deposits in the tube bank 12.

In Figs. 5 to 8 inclusive there is shown a modified construction comprising an upper longitudinal steam-and-water drum 50 and a lower longitudinal water drum 51 therebeneath, these drums being connected by a bank of upright water tubes 52. Directly beneath the lower drum 51 there is provided a combustion chamber 54 having a front wall 55, a rear wall 56, and opposed side walls 57. An opening 58 is provided in the front wall so that a suitable fuel, such as oil or pulverized fuel, may be introduced therethrough for combustion in suspension. Both of the drums extend throughout the entire length of the setting, and the arrangement is such that the hot gases flow upwardly from the rear portion of the combustion chamber on opposite sides of the lower drum 51 to a gas passage 60 located in the rear of the tube bank 52. From this passage the gases flow forwardly among the water tubes 52 to a gas outlet duct 61 at the front of the setting. Baffles 62 are provided to direct the gases in a tortuous path. A transverse row of upright water tubes 64 is located a short distance to the rear of the tube bank 52 to provide a slag screen and also to support a refractory wall 65 which forms the front wall of the gas passage 60.

Figure 6:
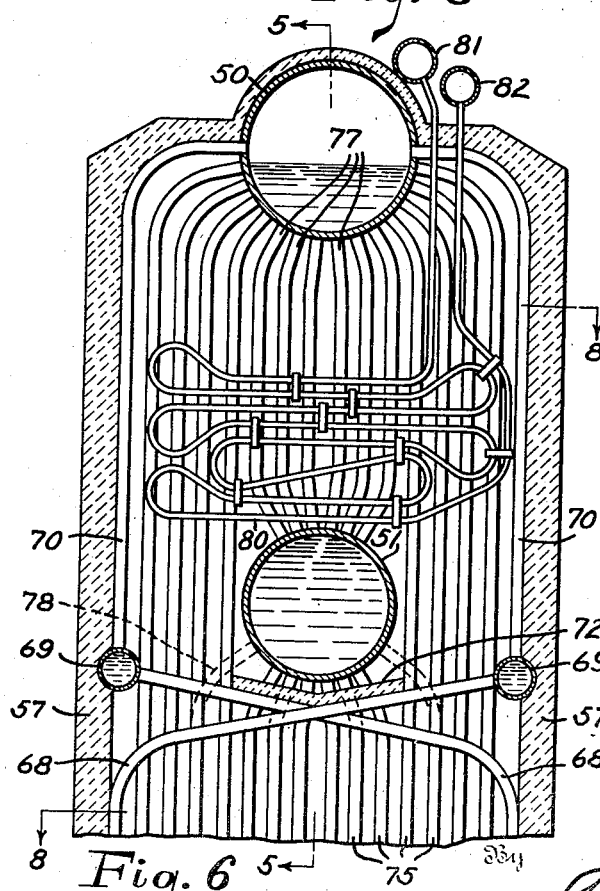
Fig. 6 is a section on the line 6—6 of Fig. 5.
Figure 7:
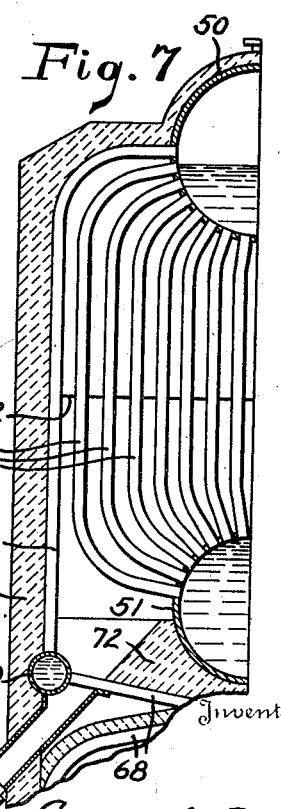
Fig. 7 is a fragmentary section on the line 7—7 of Fig. 5.

Two longitudinal headers 67 are provided on opposite sides of the combustion chamber 54 near the floor thereof, and upright water wall tubes 68 extend upwardly from these headers in cooling relation to the side walls 57, the upper portions of these tubes being bent laterally and crossing beneath the lower drum 51. The upper ends of the tubes 68 are connected to longitudinal headers 69 located on opposite sides of the water drum 51. From these headers 69 water tubes 70 extend upwardly to the upper drum 50. The laterally extending portions of the tubes 68 support refractory material 72 which forms a roof for the combustion chamber 54 and aids in protecting the lower drum 51 from the heat of combustion. In the rear portion of the combustion chamber the refractory 72 is omitted adjacent the side walls 57, as shown in Fig. 6, so that the gases may flow upwardly to the passage 60. The rear ends of the headers 67 are connected by a transverse header 74 from which a row of upright water tubes 75 extend upwardly in cooling relationship to the rear wall 56. The tubes in the central portion of this row are connected to the lower drum 51, while the tubes in the end portions of the row are connected to the upper drum 50, as shown in Fig. 6. A transverse row of upright water tubes 77 connects the rear portions of the drums 50 and 51 to protect the central part of the rear wall of the gas passage 60. Downcomer tubes 78 connect the lower drum 51 with the rear header 74 to supply water thereto.

Within the gas passage 60 there is provided a superheater 80 having an inlet header 81 and an outlet header 82 located adjacent the upper drum 50. Steam from the upper drum is delivered to the inlet header through tubes 84. A baffle plate 85 is mounted within the drum 50 and beneath the inlet ends of the tubes 84 to ensure the delivery of substantially dry steam to the superheater.

In the operation of this embodiment the water wall tubes 68 are subjected to the radiant heat of the combustion flame and consequently generate steam at a high rate, this steam being delivered through the tubes 70 to the upper drum 50. The hot gases flow upwardly from the rear part of the combustion chamber between the laterally extending portions of the tubes 68, which serve as a slag screen. The gases thus enter the gas passage 60, where they flow in contact with the superheater 80. From the passage 60 the gases travel forwardly between the tubes 64, which provide a further slag screen, and thence into contact with the tube bank 52, eventually escaping through the duct 61. The baffles 62 will direct the gases in a tortuous path during their forward travel. This embodiment likewise has a high steam generating capacity in proportion to the amount of floor space required for the installation. The lower drum 51 is well protected from the radiant heat of the combustion chamber by the water tubes 68 and the refractory material 72.

Having thus described my invention, what I claim as new and desire to secure by Letters Patent is:

1. A steam generator comprising walls providing a setting shaped to form a combustion chamber in the lower portion thereof, a longitudinal water drum above the combustion chamber, a longitudinal steam-and-water drum above the water drum, a bank of water tubes connecting the drums, rows of upright water wall tubes on opposite sides of the combustion chamber, the water wall tubes being bent laterally to provide portions which cross beneath the water drum and protect the same from radiant heat, two longitudinal headers located on opposite sides of the water drum, the upper ends of the water wall tubes being connected to the headers, rows of water tubes extending upwardly from the headers in cooling relation to the adjacent side walls of the setting and entering the steam-and-water drum on opposite sides thereof, and means to conduct hot gases from the combustion chamber into contact with the said bank of water tubes.

2. A steam generator comprising side walls and end walls providing a setting shaped to form a combustion chamber in the lower portion thereof, a longitudinal water drum above the combustion chamber, a longitudinal steam-and-water drum above the water drum, a bank of upright water tubes connecting the drums and spaced from one of said end walls to provide a passage through which hot gases may flow upwardly from the combustion chamber to the tube bank, rows of upright water wall tubes on opposite sides of the combustion chamber, the water wall tubes being bent laterally to provide portions which cross beneath the water drum and protect the same from radiant heat, two longitudinal headers located on opposite sides of the water drum, the upper ends of the water wall tubes being connected to the headers, and rows of water tubes extending upwardly from the headers in cooling relation to the adjacent side walls of the setting and entering the steam-and-water drum on opposite sides thereof above the said tube bank.

3. A steam generator comprising a setting having a front wall, a rear wall, and side walls, the setting being shaped to form a combustion chamber in the lower portion thereof, a longitudinal water drum above the combustion chamber and spaced forwardly from the said rear wall, a longitudinal steam-and-water drum above the water drum, a bank of upright water tubes connecting the drums, rows of upright water wall tubes on opposite sides of the combustion chamber, the water wall tubes being bent laterally to provide portions which cross beneath the water drum and protect the same from radiant heat, a roof for the combustion chamber supported by the laterally extending portions of the water wall tubes, the rear margin of the roof being spaced forwardly from the rear wall so that hot gases may flow upwardly from the combustion chamber, and a transverse row of spaced water tubes located in the rear portion of the combustion chamber and extending upwardly adjacent the rear margin of the combustion chamber roof and thence to the steam-and-water drum, the various parts being so constructed and arranged that the hot gases from the combustion chamber are compelled to flow twice between the tubes of the said transverse row before reaching the said tube bank.

4. A steam generator comprising a setting having a front wall, a rear wall, and side walls, the setting being shaped to form a combustion chamber in the lower portion thereof, a longitudinal water drum above the combustion chamber and spaced forwardly from the said rear wall, a longitudinal steam-and-water drum above the water drum, a bank of upright water tubes connecting the drums, two longitudinal headers located adjacent the lower portions of the respective side walls, a transverse header located adjacent the lower portion of the rear walls, rows of upright water wall tubes extending upwardly from the longitudinal headers on opposite sides of the combustion chamber, the tubes in the rear portions of the rows having their upper ends connected directly with the steam-and-water drum and the tubes in the front portions of the rows being bent laterally to provide portions which cross beneath the water drum and protect the same from radiant heat, a roof for the combustion chamber supported by the laterally extending portions of the water wall tubes, the rear margin of the roof being spaced forwardly from the rear wall so that hot gases may flow upwardly from the combustion chamber, a transverse row of water wall tubes extending upwardly from the transverse header to the steam-and-water drum in cooling relation to the rear wall, and a transverse row of spaced water tubes extending upwardly from the transverse header in front of the transverse row of water wall tubes, the said spaced water tubes extending upwardly adjacent the rear margin of the combustion chamber roof and thence to the steam-and-water drum, the various parts being so constructed and arranged that the hot gases from the combustion chamber are compelled to flow twice between the said spaced water tubes before reaching the said tube bank.

5. A steam generator comprising side walls and end walls providing a setting shaped to form a combustion chamber in the lower portion thereof, a longitudinal water drum above the combustion chamber, a longitudinal steam-and-water drum above the water drum, both of the drums extending substantially the entire length of the setting, a bank of upright water tubes connecting the drums and spaced from one of said end walls to provide a gas passage, rows of upright water wall tubes on opposite sides of the combustion chamber, the water wall tubes being bent laterally to provide portions which cross beneath the water drum and protect the drum from radiant heat, and refractory material supported by the laterally extending portions of the water wall tubes to form a roof for the combustion chamber, the refractory material being omitted adjacent the side walls beneath the said passage so that gases may flow upwardly from the combustion chamber to the passage.

GUSTAV A. REHM.